United States Patent
Humfeld et al.

(10) Patent No.: US 10,272,658 B2
(45) Date of Patent: Apr. 30, 2019

(54) SYSTEM AND METHOD FOR FORMING A COMPOSITE PART

(71) Applicant: THE BOEING COMPANY, Chicago, IL (US)

(72) Inventors: Keith Daniel Humfeld, Federal Way, WA (US); Steven Michael Shewchuk, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 743 days.

(21) Appl. No.: 14/794,238

(22) Filed: Jul. 8, 2015

(65) Prior Publication Data

US 2017/0008266 A1    Jan. 12, 2017

(51) Int. Cl.
*B29C 70/00*    (2006.01)
*B32B 37/10*    (2006.01)
*B29C 70/44*    (2006.01)

(52) U.S. Cl.
CPC .......... *B32B 37/1018* (2013.01); *B29C 70/44* (2013.01); *B32B 2305/72* (2013.01)

(58) Field of Classification Search
CPC ..... B29C 70/44; B29C 70/443; B29C 70/446; B29C 70/34; B29C 70/342
See application file for complete search history.

(56) References Cited

U.S. PATENT DOCUMENTS

| | | | |
|---|---|---|---|
| 4,233,645 A | 11/1980 | Balderes | |
| 5,323,294 A | 6/1994 | Layton | |
| 6,665,186 B1* | 12/2003 | Calmidi | ................... H01L 23/16 165/80.4 |
| 8,334,592 B2* | 12/2012 | Bhagwagar | ......... H01L 23/3735 165/185 |
| 2012/0135099 A1* | 5/2012 | Dean | ....................... B29C 33/04 425/389 |

* cited by examiner

*Primary Examiner* — Jacob T Minskey
*Assistant Examiner* — Matthew Hoover
(74) *Attorney, Agent, or Firm* — Joseph M. Butscher; The Small Patent Law Group LLC (57) ABSTRACT

A method of forming a composite part may include positioning composite layers onto a part-supporting surface of a support tool. The composite layers combine to form the composite part. The method may also include covering the composite part on the support tool with a vacuum bag, and forming a heat transfer assembly on the vacuum bag in relation to a portion of the composite part. The method may include forming the heat transfer assembly on the vacuum bag by depositing a fluid layer of material onto the vacuum bag, inserting heat transfer promoters into the fluid, and cooling the fluid to form a solid heat transfer assembly.

9 Claims, 7 Drawing Sheets

SYSTEM AND METHOD FOR FORMING A COMPOSITE PART

FIELD OF THE DISCLOSURE

Embodiments of the present disclosure generally relate to systems and methods for forming a composite part, and, more particularly, to systems and methods for promoting efficient heat transfer between components as the composite part is cured.

BACKGROUND OF THE DISCLOSURE

Various structures are formed from composite parts. For example, portions of aircraft, such as wings, may be formed from composite parts. A composite part may include a network of reinforcing fibers that are generally applied in layers, and a polymeric resin that substantially wets the reinforcing fibers to form a binding contact between the resin and the reinforcing fibers. The composite part may then be formed into a structural component by a variety of known forming methods, such as an extrusion process or other forming processes. Known fibers include glass, carbon, basalt, aramid, or the like.

In order to form a composite part, layers of composite material are typically laid up on a tool. After all of the layers are positioned on the tool, the tool and the composite layers are positioned within a curing device, such as an autoclave. The autoclave is then operated to heat the composite layers so that the resin cures and binds the layers together.

During the curing process, the rate of heating of the composite part is generally determined by a heat transfer coefficient between air within the curing device and a bag secured over the composite part. Heat energy generated within the curing device is transferred through the bag and into the composite part. Often, portions of a composite part are to be heated at a particular, specified rate during the curing process. Due to the high thermal mass of the tool, variability in airflow, possible heat generated by the resin during cure, and variation in part thickness, the process of controlling specified heating rates and times may be inconsistent and unpredictable.

Accordingly, a need exists for an efficient system and method for curing a composite part.

SUMMARY OF THE DISCLOSURE

Certain embodiments of the present disclosure provide a method of forming a composite part. The method may include positioning composite layers onto a part-supporting surface of a support tool. The composite layers combine to form the composite part. The method may also include covering the composite part on the support tool with a vacuum bag, and forming a heat transfer assembly on the vacuum bag in relation to a portion of the composite part.

In at least one embodiment, the forming may include depositing a fluid layer of material onto an outer surface of the vacuum bag, inserting one or more heat transfer promoters into the fluid layer of material, cooling the fluid layer to a first temperature below a melting point of the material to form a heat transfer base, and securing the heat transfer promoter(s) in position relative to the heat transfer base through the cooling. The material may be formed of a metal that has a melting point that exceeds a curing temperature used to cure the composite material and is less than a temperature at which the vacuum bag burns. In at least one embodiment, the material may be a metal that exhibits a thermal conductivity in the range of 30-300 W/mK in a solid phase, and has a melting point between 365° F. and 400° F.

Each of the heat transfer promoters may be shaped as one or more of a panel, a plate, a pin, a post, a spike, an irregular shape, or the like. In at least one embodiment, multiple heat transfer promoters are separated by air channels.

The method may also include forming a composite part curing support assembly including the support tool, the composite part, the vacuum bag, and the heat transfer assembly. The method may also include positioning the composite part curing support assembly into a curing chamber of an autoclave, and curing the composite part within the curing chamber. The method may also include removing the vacuum bag from the composite part after the curing, and removing the heat transfer assembly from the vacuum bag after the curing.

In at least one embodiment, the positioning composite layers onto the part-supporting surface of the support tool may include laying up the composite layers onto the part-supporting surface of the support tool. The forming may include forming the heat transfer assembly over an entirety of an outer surface of the vacuum bag. In at least one other embodiment, the forming may include forming the heat transfer assembly over a portion of an outer surface of the vacuum bag.

Certain embodiments of the present disclosure provide a system for forming a composite part. The system may include a support tool including a part-supporting surface, a composite part supported on the part-supporting surface, a vacuum bag positioned over the composite part on the part-supporting surface, and a heat transfer assembly coupled to an outer surface of the vacuum bag. The heat transfer assembly may include a heat transfer base mounted on the outer surface of the vacuum bag, and one or more heat transfer promoters extending outwardly from the heat transfer base.

The heat transfer base may be formed by depositing a liquid layer of metal onto the outer surface. The heat transfer promoter(s) may be inserted into the liquid layer of metal. The liquid layer cools and solidifies to secure the heat transfer promoter(s) in position. The metal may exhibit a thermal conductivity in the range of 30-300 W/mK in a solid phase, and have a melting point between 365° F. and 400° F.

Certain embodiments of the present disclosure provide a heat transfer assembly configured to be coupled to an outer surface of a vacuum bag that is positioned over a composite part supported on a part-supporting surface of a support tool. The heat transfer assembly may include a heat transfer base configured to be mounted on the outer surface of the vacuum bag. The heat transfer base may be formed by depositing a liquid layer of metal onto the outer surface. The heat transfer assembly may also include a plurality of heat transfer promoters extending outwardly from the heat transfer base. The heat transfer promoters are inserted into the liquid layer of metal. The liquid layer cools and solidifies to secure the plurality of heat transfer promoters in position.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a system and method of curing a composite part that is configured to control heating and cooling of the composite part. The system and method may include depositing a fluid material (for example, a melted liquid or semi-liquid material, such as a metal heated to a temperature that exceeds its melting point) onto an outer surface of a vacuum bag that covers a composite part that is supported on a tool. The fluid material cools and hardens to form a heat transfer base. At least one heat transfer promoter is coupled to the fluid material before it solidifies. The heat transfer promoter(s) may include one or more protuberances, such as planar fins, posts, tubes, mesh screens, depressions, embossments, ribs, and/or the like. The heat transfer promoters are coupled to the fluid material. As the fluid material cools and hardens (thereby solidifying), the heat transfer promoters are secured in position. As such, the heat transfer base and the heat transfer promoter(s) form a heat transfer assembly that directly contacts the outer surface of the bag to increase heat transfer with the composite part during a curing process.

A first surface of the composite part, such as an interior or lower surface, may be supported by and contact a supporting surface of a tool. The heat transfer assembly may be formed over an outer surface of a vacuum bag that covers a second surface of the composite part, such as an exterior or upper surface.

Certain embodiments of the present disclosure provide a method of forming a heat transfer assembly (such as a heat sink) onto a composite part. The method may include pouring, injecting, spraying, spreading, or otherwise depositing a molten metal onto a bag that covers the composite part. The method may also include allowing the molten metal to form a solid metal surface over the bag. In at least one embodiment, one or more heat transfer promoters are mounted on the molten metal before it cools to form the solid metal surface. As the molten metal cools and solidifies, the heat transfer promoters are secured in position. In at least one embodiment, tubes may installed into the molten metal. The tubes may be configured to contain and transport heating or cooling liquid or gas.

Embodiments of the present disclosure provide a heat transfer assembly that is formed on a bag that is positioned over a composite part that is supported on a tool. The heat transfer assembly improves heat transfer between the composite part and air within a curing device. The heat transfer assembly provides efficient heating of the composite part. Efficient, uniform heating leads to shorter cure cycle durations. Further, efficient heat transfer reduces the maximum temperature of composite parts that exotherm during a resin curing process.

Figure 1:
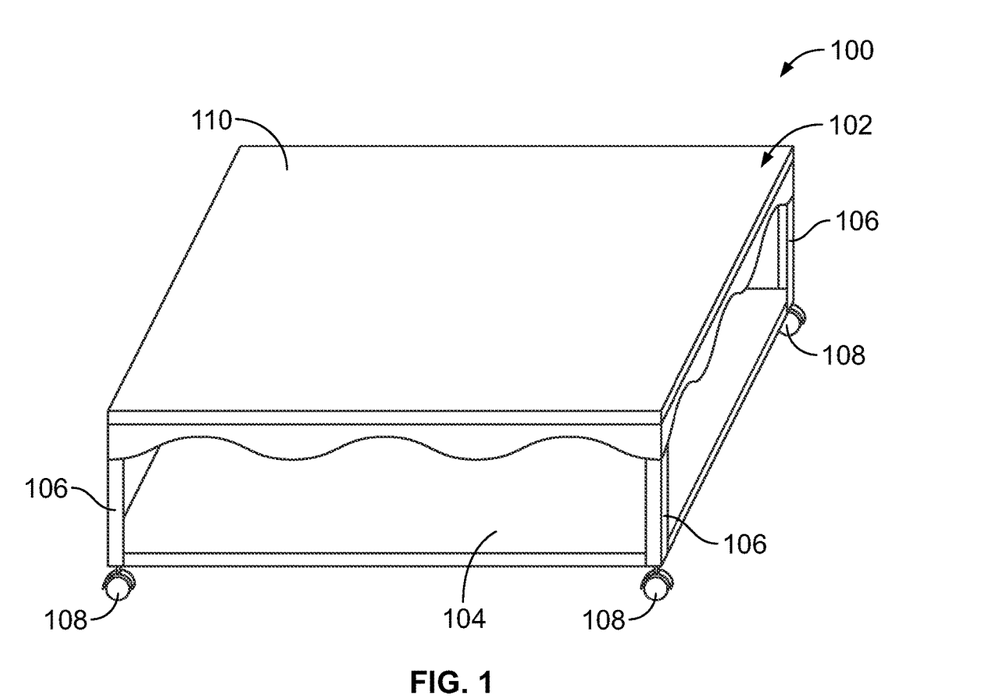
FIG. 1 illustrates a perspective top view of a support tool, according to an embodiment of the present disclosure.

FIG. 1 illustrates a perspective top view of a support tool 100, according to an embodiment of the present disclosure. The support tool 100 may be used to initially form a composite part. For example, layers of composite material may be laid up onto the support tool 100. The support tool 100 may be formed of a metal, such as stainless steel, aluminum, or the like.

The support tool 100 may include a face sheet 102 connected to a base 104 through one or more upstanding beams 106. The face sheet 102 and the base 104 may reside in planes that are parallel to one another. Each upstanding beam 106 may connect outer corners of the face sheet 102 and the base 104 together, and may generally be perpendicular to the planes in which the face sheet 102 and the base 104 reside. One or more wheels 108 may be coupled to the base 104. As such, the support tool 100 may form a cart structure that may rolled into and out of a curing chamber of a curing device, such as an autoclave, for example. Alternatively, the support tool 100 may not include the base 104, the beams 106, and/or the wheels 108.

The face sheet 102 may include a part-supporting surface 110, such as an upper surface. The part-supporting surface 110 may be a planar, flat surface that is configured to be in intimate contact with a surface of a composite part, such as a lower layer of composite material.

While shown as a planar, flat surface, the face sheet 102 may be formed as various other shapes and sizes, depending on the size and shape of a composite part to be formed. For example, the face sheet 102 may be formed as a semi-cylindrical, fully cylindrical, irregularly curved, angled, and/or various other shaped structure.

In order to form a composite part, one or more composite layers may be laid up on the part-supporting surface 110. For example, the composite part may include a network of reinforcing fibers that are generally applied in layers, and a polymeric resin that are laid up onto the part-supporting surface 110.

Figure 2:
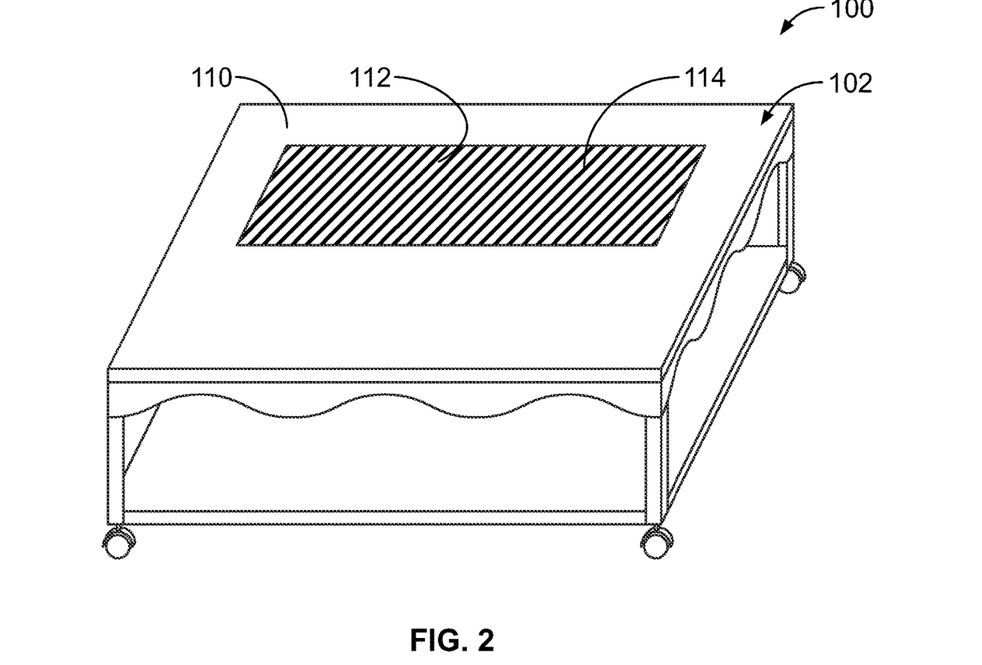
FIG. 2 illustrates a perspective top view of a composite part positioned on a support tool, according to an embodiment of the present disclosure.

FIG. 2 illustrates a perspective top view of a composite part 112 positioned on the support tool 100, according to an embodiment of the present disclosure. The composite part 112 may include a plurality of composite layers that are laid up onto the part-supporting surface 110 of the face sheet 102. A first surface (hidden from view) of the composite part 112 directly contacts and is supported by the part-supporting surface 110. Accordingly, the first surface of the composite part 112 is in intimate contact with the part-supporting surface 110 of the face sheet 102. The first surface may be a lower surface and is opposite from a second surface 114, such as an upper exposed surface. After the composite part 112 is positioned on the support tool 100, a vacuum bag may be secured over the composite part 112.

Figure 3:
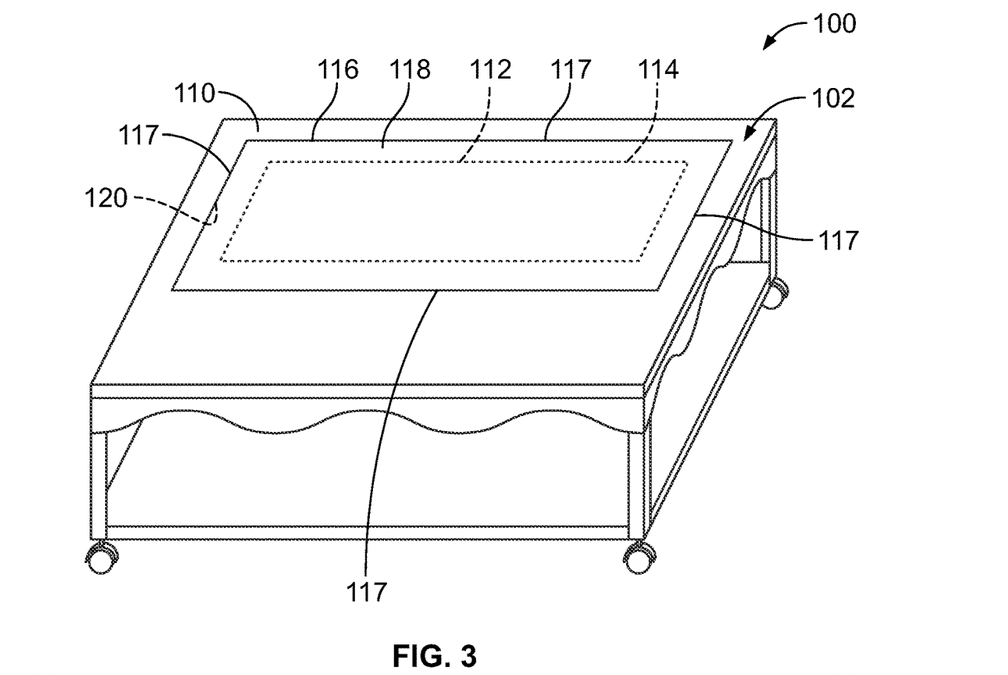
FIG. 3 illustrates a perspective top view of a vacuum bag secured onto a support tool over a composite part, according to an embodiment of the present disclosure.

FIG. 3 illustrates a perspective top view of a vacuum bag 116 secured onto the support tool 100 over the composite part 112, according to an embodiment of the present disclosure. The vacuum bag 116 may be formed of nylon, a polyamide, or the like. The vacuum bag 116 forms a fluid-tight seal 117 over the composite part 112, and may be sealingly secured to the part-supporting surface 110 around the periphery of the composite part 112 through an edge sealant, such as Tacky Tape®. The vacuum bag 116 may be formed as a flexible, planar sheet of material having an outer surface 118 that is opposite from an interior surface 120, which may directly contact the second surface 114 of the composite part 112.

The vacuum bag 116 may be used to provide vacuum integrity with respect to the composite part 112. For example, as shown, the vacuum bag 116 may be positioned over the composite part 112 and a vacuum may draw out air therein to provide the composite part 112 with a solid outer surface. Vacuuming may be used to consolidate plies of material used to form the composite part 116 prior to a curing process.

Figure 4:
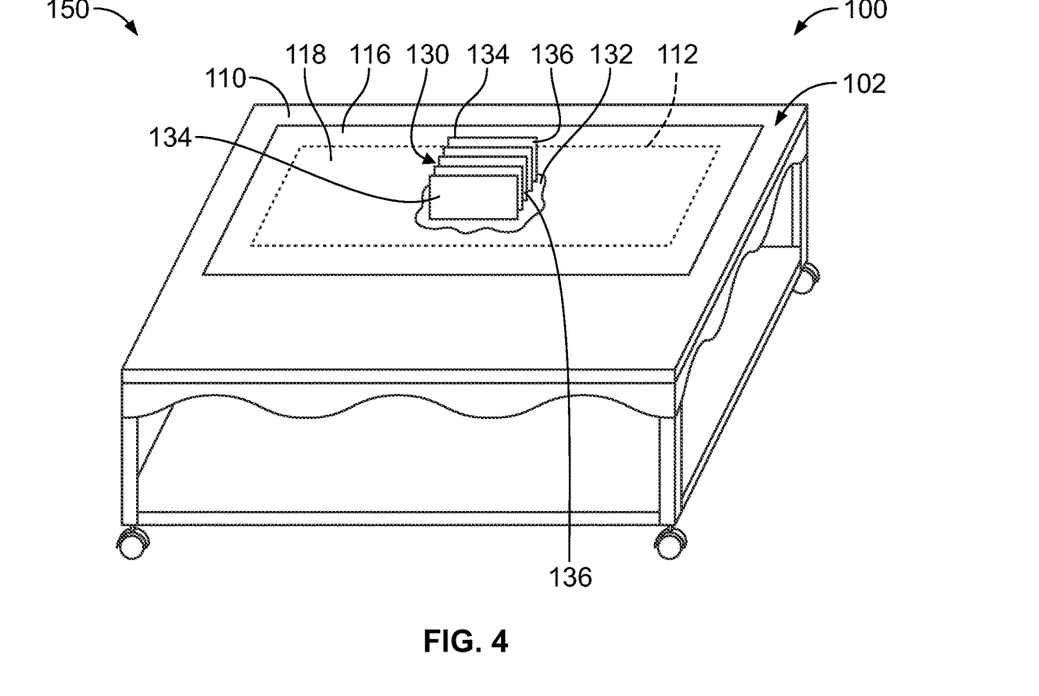
FIG. 4 illustrates a perspective top view of a heat transfer assembly coupled to a vacuum bag that is positioned over a composite part supported by a support tool, according to an embodiment of the present disclosure.

FIG. 4 illustrates a perspective top view of a heat transfer assembly 130 coupled to the vacuum bag 116 that is positioned over the composite part 112 that is supported by the support tool 100, according to an embodiment of the present disclosure. The heat transfer assembly 130 is formed over and on at least a portion of outer surface 118 of the vacuum bag 116. The heat transfer assembly 130 may be formed over more or less of the vacuum bag 116 than shown. The heat transfer assembly 130 is formed over the vacuum bag 116 that overlay portions of the composite part 112 that benefit from increased heat transfer between circulating heated air within a curing chamber of a curing device and/or the support tool 100. For example, the heat transfer assembly 130 may be formed over a portion of the vacuum bag 116 that overlays thicker portions of the composite part 112 or in any region of the part that may need enhanced heat transfer.

The heat transfer assembly 130 may include a heat transfer base 132 that is deposited onto the outer surface 118 of the vacuum bag 116. The heat transfer base 132 may be formed of a metal, such as tin, aluminum, copper, silver, or the like. The heat transfer base 132 may be formed of a metal that melts at a temperature above a curing temperature, but below a temperature that would burn or otherwise compromise the vacuum bag 116. The heat transfer base 132 connects to and secures to one or more heat transfer promoters 134. The heat transfer assembly 130 may provide a heat sink. Further, in regions where excessive heat may be generated due to exothermic reactions, the heat transfer assembly 130 may also aid in removing heat from the part.

In general, the heat transfer assembly 130 may be configured to provide a consistent temperature across an entire part.

The heat transfer base 132 may be a metal that is solid at a curing temperature (such as 365° F.), and may be in a fluid phase (such as a liquid or semi-liquid phase) at an increased temperature (such as 400° F.) that does not burn or otherwise damage the vacuum bag 116. In at least one embodiment, the melting point of the metal used to form the heat transfer base is greater than 365° F. and less than 400° F. In the solid phase, the metal used to form the heat transfer base 132 may exhibit a thermal conductivity in the range of 30-300 W/mK (Watts per meter Kelvin). For example, in at least one embodiment, the metal used to form the heat transfer base 132 may be lead-tin alloy No. 123. Alternatively, various other metals may be used. However, lead-tin alloy No. 123 exhibits a thermal conductivity in the range of 30-300 W/mK in a solid phase, and has a melting temperature that exceeds 365° F., but is less than 400° F., thereby making it particular suitable for a composite curing process.

Each heat transfer promoter 134 may be a flat, planar protuberance, such as a fin, panel, plate or the like. Optionally, the heat transfer promoters 134 may be or include mesh screens. In at least one other embodiment, the heat transfer promoters 134 may be longitudinal members, such as pins, spikes, posts, or the like. In at least one other embodiment, the heat transfer promoters 134 may include regular or irregular curved shapes. For example, the heat transfer promoters 134 may be shaped as semispherical bumps, concave or convex surfaces, and/or the like. The heat transfer promoters 134 may be formed of a solid metal. For example, the heat transfer promoters 134 may be formed of the same metal that forms the heat transfer base 132. Alternatively, the heat transfer promoters 134 may be formed of various other materials, such as sapphire. One or more heat transfer promoters 134 may be normal to the part-supporting surface 110 of the face sheet 102. Optionally, the heat transfer promoter(s) 134 may outwardly extend from the heat transfer base 132 at various other angles that are not normal to the part-supporting surface 110.

As shown, a plurality of heat transfer promoters 134 may extend outwardly from the heat transfer base 132. Neighboring heat transfer promoters 134 (that is, two heat transfer promoters that are closest to one another) are separated by an air channel 136. The air channels 136 are configured to allow air to pass therethrough.

In order to form the heat transfer assembly 130, a liquid material, such as molten metal, may be deposited onto the outer surface 118 of the vacuum bag 116 over a portion of the composite part 112 in which increased heat transfer is desired. For example, the liquid material that forms the heat transfer base 132 may be sprayed, poured, spread, or otherwise deposited onto the outer surface 118. While the metal is still in a liquid or semi-liquid phase, the heat transfer promoters 134 are coupled thereto. For example, lower edges of the heat transfer promoters 134 may be urged into the metal before it hardens into the formed heat transfer base 132. The heat transfer promoters 134 may be stabilized in position as the metal cools and hardens, such as through clamps, brackets, or the like. As the metal cools and hardens, the heat transfer base 132 is formed. The hardening of the heat transfer base 132 secures the heat transfer promoters 134 in position.

Figure 5:
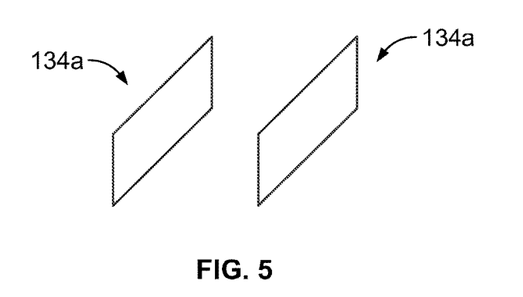
FIG. 5 illustrates a perspective top view of heat transfer promoters, according to an embodiment of the present disclosure.

FIG. 5 illustrates a perspective top view of heat transfer promoters 134a, according to an embodiment of the present disclosure. Each heat transfer promoter 134a may be a planar member, such as a panel, fin, beam, or the like. Each heat transfer promoter 134a may be individually inserted into the heat transfer base 132 (shown in FIG. 4) before it solidifies.

Figure 6:
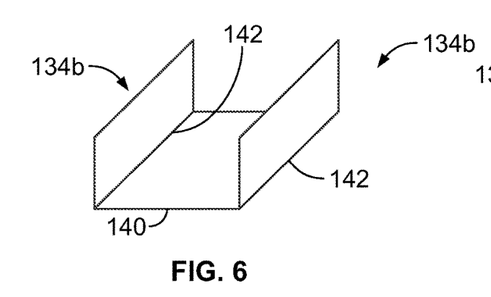
FIG. 6 illustrates a perspective top view of heat transfer promoters, according to an embodiment of the present disclosure.

FIG. 6 illustrates a perspective top view of heat transfer promoters 134b according to an embodiment of the present disclosure. The heat transfer promoters 134b may be planar members that are connected together through a connecting panel 140 therebetween. For example, the connecting panel 140 may extend between lower edges 142 of the heat transfer promoters 134b. The connecting panel 140 supports the heat transfer promoters 134b in an upright position. As such, when the heat transfer promoters 134 are urged into the heat transfer base 132 (shown in FIG. 4) before it solidifies, the heat transfer promoters 134b are oriented in an upright position without the need for a separate and distinct stabilizers. The heat transfer base 132 may solidify and bond to a lower surface of the connecting panel 140, and or over and around the connecting panel 140.

The connecting panel 140 may be a solid piece of material. Optionally, the connecting panel 140 may include one or more openings formed therethrough. For example, the connecting panel 140 may include a plurality of spaced apart beams. In at least one other embodiment, the connecting panel 140 may be or include a mesh screen.

Figure 7:
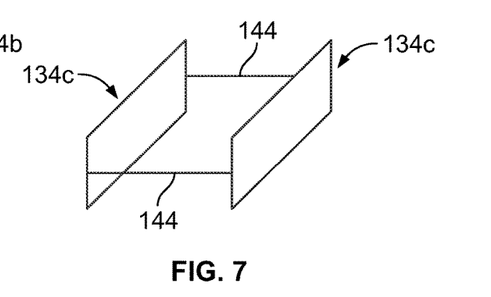
FIG. 7 illustrates a perspective top view of heat transfer promoters, according to an embodiment of the present disclosure.

FIG. 7 illustrates a perspective top view of heat transfer promoters 134c, according to an embodiment of the present disclosure. The heat transfer promoters 134c may be planar members that are connected together through one or more struts 144, which maintain the heat transfer promoters 134c in an upright position. The strut(s) 144 may extend between various portions of the heat transfer promoters 134c other than shown. For example, in one embodiment, a single strut may extend between centers of opposed heat transfer promoters 134c.

Referring again to FIG. 4, a composite part curing support assembly 150 includes the support tool 100, the composite part 112, the vacuum bag 116, and the heat transfer assembly 130. After the heat transfer assembly 130 is formed on the vacuum bag 116, the composite part curing support assembly 150 may be positioned within a curing chamber of a curing device.

Figure 8:
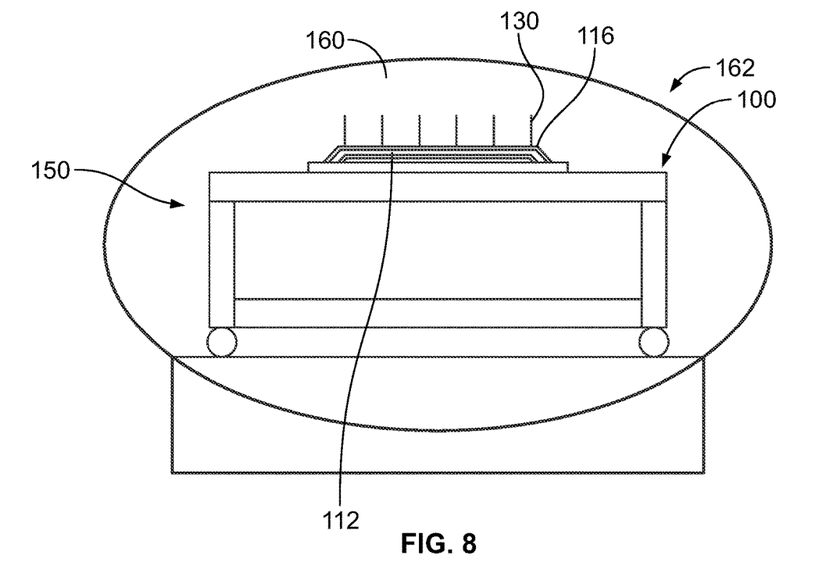
FIG. 8 illustrates a composite part curing support assembly positioned within a curing chamber of a curing device, according to an embodiment of the present disclosure.

FIG. 8 illustrates the composite part curing support assembly 150 positioned within a curing chamber 160 of the curing device 162, according to an embodiment of the present disclosure. The curing device 162 may be an autoclave for example. The curing device 162 is configured to cure the composite part 112 supported on by the support tool 100. The heat transfer assembly 130 increases heat transfer between heated air within the curing chamber 160, the support tool 100, and the composite part 112.

After the curing process, the composite part curing support assembly 150 is removed from the curing chamber 160. As the vacuum bag 116 is removed from the composite part 112, the heat transfer assembly 130 is removed. That is, because the heat transfer assembly 130 is coupled to the vacuum bag 116, as the vacuum bag 116 is removed from the composite part 112, the heat transfer assembly 130 follows along with the vacuum bag 116.

In at least one other embodiment, the heat transfer base 132 of the heat transfer assembly 130 is formed as a thin layer (for example, 1 mm thick) that may be removed from the vacuum bag 116 during a debagging process, such as through crumpling or breaking. In at least one embodiment, a release coating may be sprayed on the vacuum bag 116 before the heat transfer assembly 130 is formed thereon, so as to allow the heat transfer assembly 130 to be easily removed therefrom. The broken metal that separates from the vacuum bag 116 may be collected, melted, and returned to a reservoir that may be used to fabricate future heat transfer assemblies.

Further, in at least one embodiment, a mold may be used to form the heat transfer promoters 134. The heat transfer promoters 134 may be formed from the same metal as the heat transfer base 132. In this manner, the heat transfer promoters 134 may be formed from recycled metal.

Figure 9:
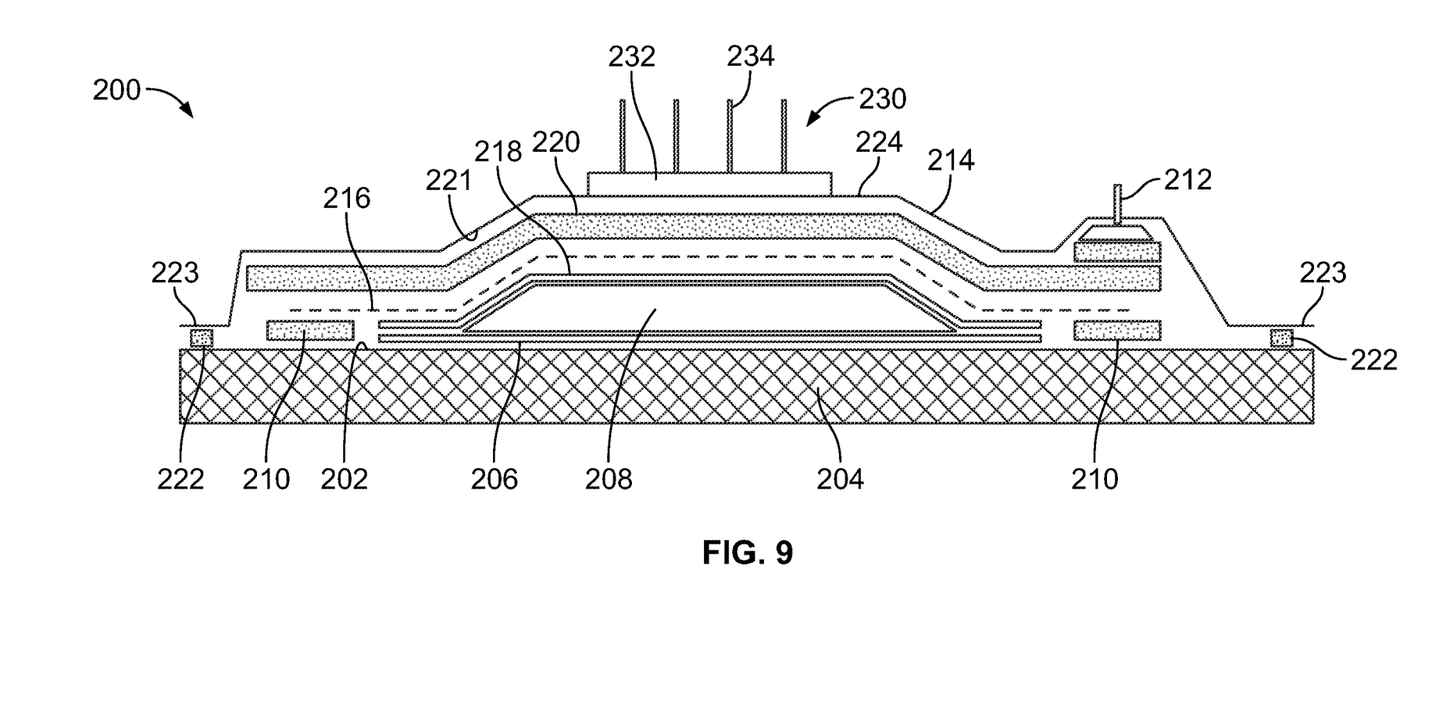
FIG. 9 illustrate a transverse cross-sectional view of a composite part curing support assembly, according to an embodiment of the present disclosure.

FIG. 9 illustrate a transverse cross-sectional view of a composite part curing support assembly 200, according to an embodiment of the present disclosure. The composite part curing support assembly 200 is an example of the composite part curing support assembly 150 shown and described with respect to FIGS. 4 and 8.

As shown, a part-support surface 202 of a support tool 204 supports a first surface 206 (such as a lower surface) of a composite part 208. A porous edge breather 210 may be positioned around an outer periphery of the composite part 208. The edge breather 210 is configured to allow air to pass from the composite part and out through a vacuum line 212 formed through a vacuum bag 214. Alternatively, the assembly 200 may not include the edge breather 210.

A parting film 216 may be formed over a second surface 218 (such as an upper surface) of the composite part 208 and the edge breather 210. The parting film 216 may be formed of fluorinated ethylene propylene (FEP), for example. Alternatively, the assembly 200 may not include the parting film 216.

A surface breather 220 may be positioned between the parting film 216 and an interior surface 221 of the vacuum bag 214. The surface breather 220 is configured to allow air to pass from the composite part and out through the vacuum line 212. Alternatively, the assembly 200 may not include the surface breather 220.

An edge sealant 222 provides a sealing layer between the part-support surface 202 of the support tool 204 and a peripheral edge 223 of the vacuum bag 214. The edge sealant 222 may be formed of various materials that provide a secure, fluid-tight seal between the part-support surface 202 and the peripheral edge 223. For example, the edge sealant 222 may be or include Tacky Tape®.

A heat transfer assembly 230 is coupled to an exterior surface 224 of the vacuum bag 214. The heat transfer assembly 230 may be formed on the exterior surface 224 over portions of the composite part 208 that benefit from increased heat transfer. The heat transfer assembly 230 may be formed as described above, and may include a heat transfer base 232 that supports one or more heat transfer promoters 234.

Figure 10:
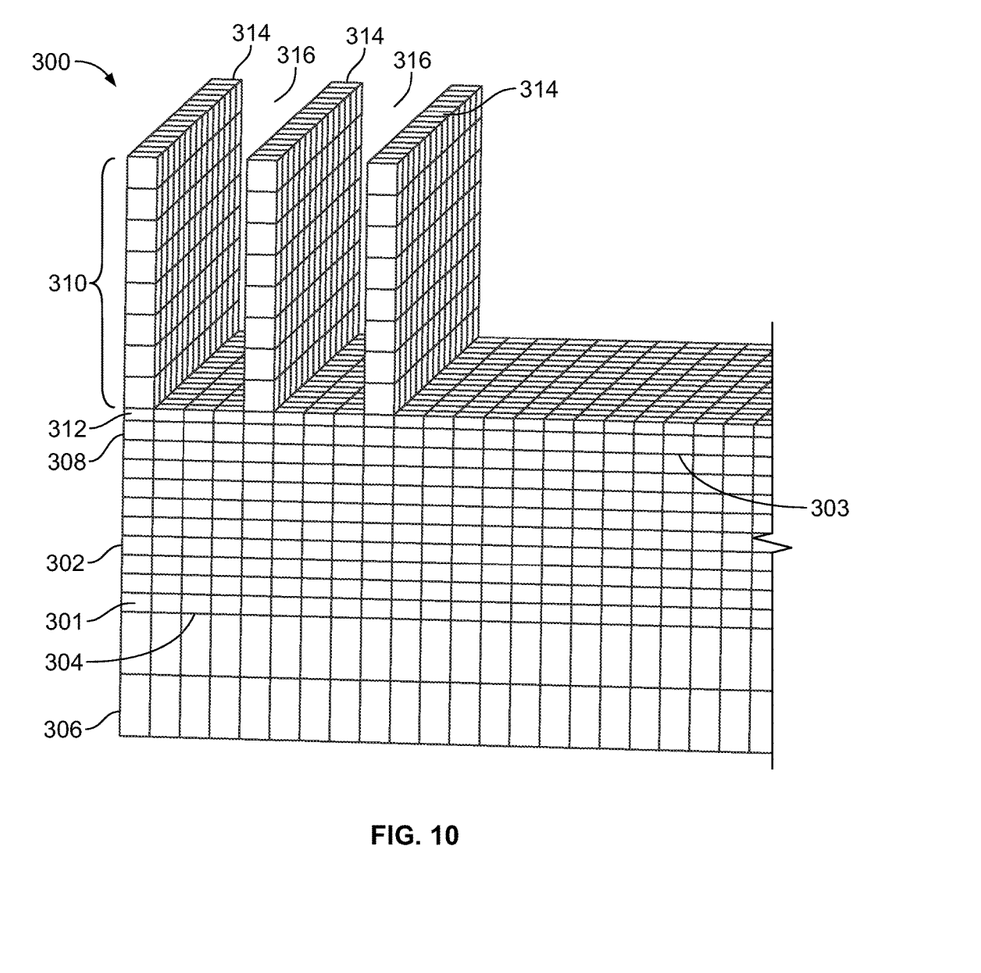
FIG. 10 illustrates a lateral view of a composite part curing support assembly, according to an embodiment of the present disclosure.

FIG. 10 illustrates a lateral view of a composite part curing support assembly 300, according to an embodiment of the present disclosure. The composite part curing support assembly 300 is an example of the composite part curing support assembly 150 shown and described with respect to FIGS. 4 and 8.

As shown, a first surface 301 of a composite part 302 is supported on a part-support surface 304 of a support tool 306. A vacuum bag 308 covers a second surface 303 (which is opposite from the first surface 301) of the composite part 302.

A heat transfer assembly 310 is formed over the vacuum bag 308, as described above. The heat transfer assembly 310 may include a heat transfer base 312 that supports a plurality of heat transfer promoters 314 in an upright, spaced-part relationship. Air channels 316 may be formed between neighboring heat transfer promoters 314.

Referring to FIGS. 4, 8, 9, and 10, the heat transfer promoters increase the surface of the composite part curing support assembly and, as such, promote increased heat transfer between the composite part and gas (such as air, an inert gas, or various other gases within an autoclave) flowing within the curing device. As air within the curing device flows through the air channels between the heat transfer promoters, the air flows over the outer surfaces of the heat transfer promoters. The increased surface area of the heat transfer promoters increases heat transfer between the flowing air and the composite part. Because heat transfer is increased, the heat transfer assembly leads to reduced duration cure cycle, which saves time and resources.

The placement of the heat transfer assembly onto a vacuum bag may depend on the nature of the composite part to be cured. For example, one or more heat transfer assemblies may be positioned in relation to portions of the composite part (such as thicker portions) that would otherwise heat at different rates than other portions. Further, the number of heat transfer promoters, as well as spacing therebetween, may depend on the nature of the composite part and a desired rate of heat transfer between the composite part and the air within the curing device and/or the support tool.

Each heat transfer promoter may be of the same size and shape. Optionally, at least some heat transfer promoters may differ in size and shape from other heat transfer promoters.

As described above, embodiments of the present disclosure may be used to form a heat transfer assembly on a vacuum bag that is secured over a composite part. Alternatively, instead of using a vacuum bag, the heat transfer assembly may be formed directly onto a surface breather, for example. In at least one other embodiment, the heat transfer assembly may be mounted onto a portion of a tool support in addition to, or instead of, the vacuum bag or the composite part.

Figure 11:
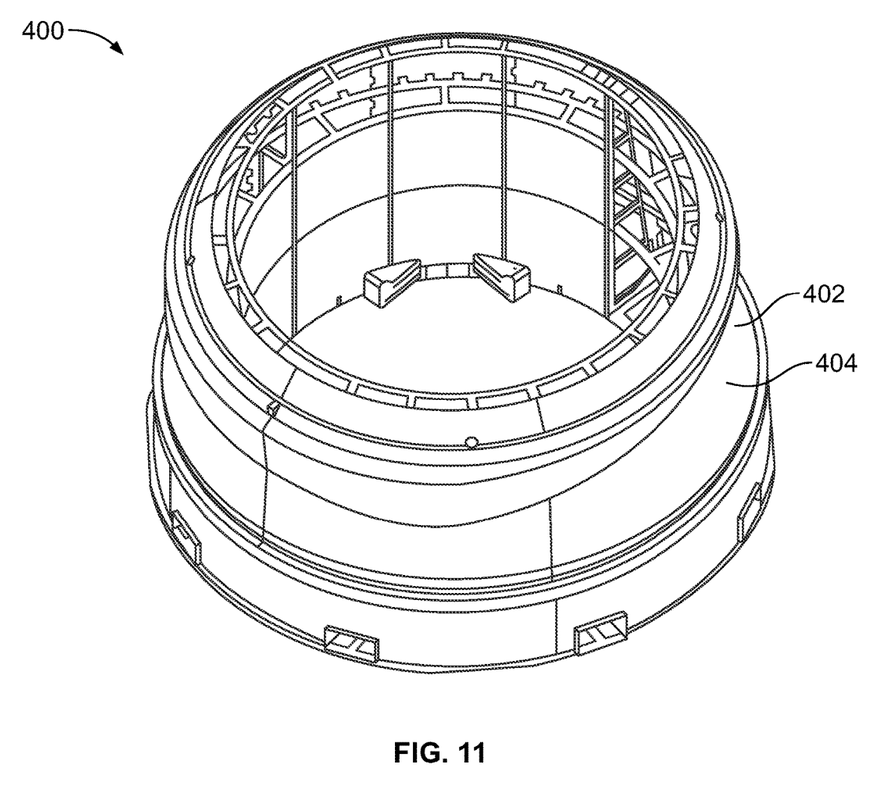
FIG. 11 illustrates a perspective top view of a support tool, according to an embodiment of the present disclosure.

FIG. 11 illustrates a perspective top view of a support tool 400 (such as a mandrel assembly), according to an embodiment of the present disclosure. Embodiments of the present disclosure may be used with respect to the support 400, for example. The support 400 may include a circumferential main structure, such as a tower 402. A composite part may be laid up around a circumferential wall 404 of the support tool 400. A vacuum bag may be positioned around the composite part. One or more heat transfer assemblies may be secured onto the vacuum bag, as described above.

Figure 12:
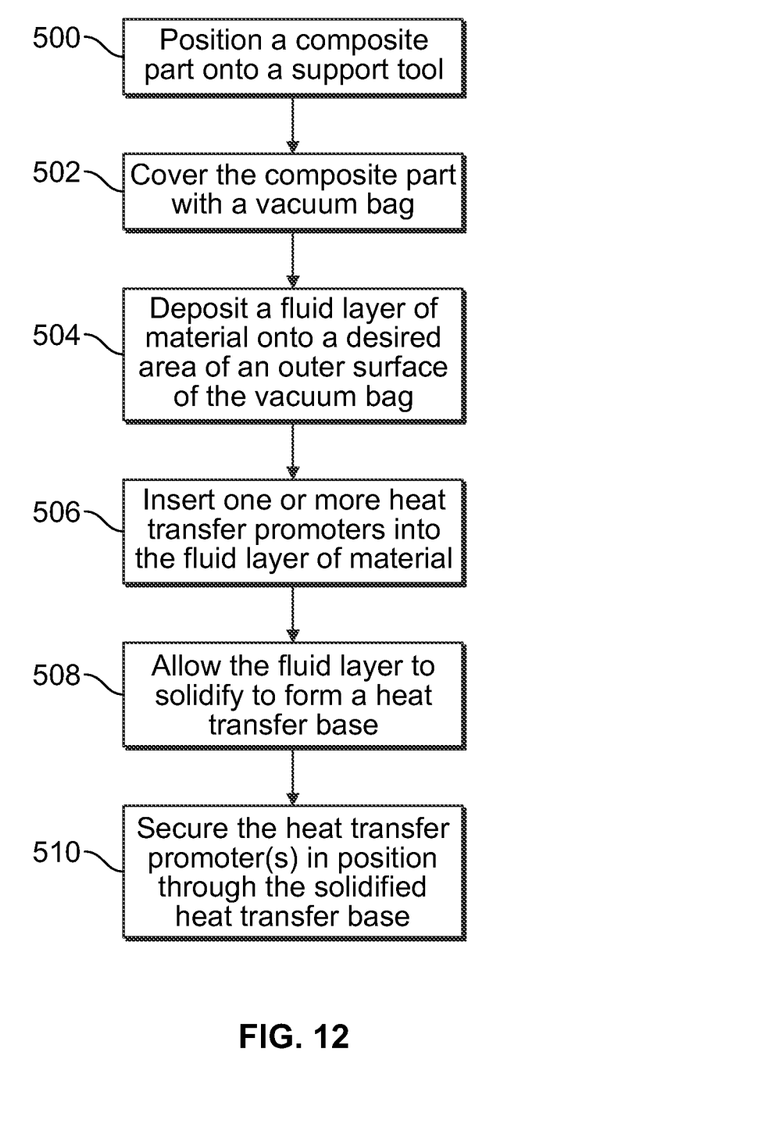
FIG. 12 illustrates a flow chart of a method of forming a heat transfer assembly on a vacuum bag positioned over a composite part, according to an embodiment of the present disclosure.

FIG. 12 illustrates a flow chart of a method of forming a heat transfer assembly on a vacuum bag positioned over a composite part, according to an embodiment of the present disclosure. At 500, a composite part is positioned onto a support tool. At 502, the composite part supported by the support tool is covered with a vacuum bag. At 504, a fluid layer of material (such as liquefied metal) is deposited onto a desired area of an outer surface of the vacuum bag. For example, the fluid layer of material may be sprayed, poured, spread, dripped, or the like onto the outer surface of the vacuum bag.

Before the fluid layer solidifies, at 506, one or more heat transfer promoters are inserted onto the fluid layer of material. For example, lower ends of the heat transfer promoters may be staked, stuck, or otherwise urged into the fluid layer.

At 508, the fluid layer is allowed to solidify (such as through cooling to a temperature below a melting point) to form a heat transfer base. As the fluid layer solidifies, the heat transfer promoters are stabilized in position relative to the fluid layer. At 510, the heat transfer promoters are secured in position through the solidified heat transfer base.

For example, as the heat transfer base solidifies, the heat transfer promoters securely and fixedly anchor into the solidified heat transfer base. In this manner, the heat transfer base and the heat transfer promoters form a heat transfer assembly that is secured to the vacuum bag.

As described above, embodiments of the present disclosure provide efficient systems and methods of curing a composite part that provide consistent heat transfer between the composite part and heat energy within a curing device. Embodiments of the present disclosure reduce a time needed to cure a composite part, thereby saving time and resources during manufacture of the composite part.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for forming a composite part, the system comprising:
   a support tool including a part-supporting surface;
   a composite part supported on the part-supporting surface;
   a vacuum bag positioned over the composite part on the part-supporting surface; and
   a heat transfer assembly coupled to an outer surface of the vacuum bag, wherein the heat transfer assembly comprises:
      a heat transfer base deposited as a liquid layer of metal onto the outer surface of the vacuum bag; and
      one or more heat transfer promoters inserted into the liquid layer of metal and extending outwardly from a cooled and solidified portion of the heat transfer base.

2. The system of claim 1, wherein the metal exhibits a thermal conductivity in the range of 30-300 W/mK in a solid phase, and has a melting point between 365° F. and 400° F.

3. The system of claim 1, wherein each of the one or more heat transfer promoters is shaped as one or more of a panel, a plate, a pin, a post, a spike, or an irregular shape.

4. The system of claim 1, wherein the one or more heat transfer promoters comprises a plurality of heat transfer promoters separated by air channels.

5. A heat transfer assembly configured to be coupled to an outer surface of a vacuum bag that is positioned over a composite part supported on a part-supporting surface of a support tool, the heat transfer assembly comprising:
   a heat transfer base configured to be mounted on the outer surface of the vacuum bag, wherein the heat transfer base is formed by depositing a liquid layer of metal onto the outer surface; and
   a plurality of heat transfer promoters extending outwardly from the heat transfer base, wherein the plurality of heat transfer promoters are inserted into the liquid layer of metal, and wherein the liquid layer cools and solidifies to secure the plurality of heat transfer promoters in position.

6. The system of claim 5, wherein the metal exhibits a thermal conductivity in the range of 30-300 W/mK in a solid phase, and has a melting point between 365° F. and 400° F.

7. The system of claim 1, wherein at least portions of the one or more heat transfer promoters are uncovered and exposed.

8. The system of claim 1, further comprising a release coating disposed between the vacuum bag and the heat transfer assembly.

9. The system of claim 1, further comprising:
   a porous edge breather around an outer periphery of the composite part, wherein the porous edge breather is configured to allow air to pass from the composite part and out through a vacuum line formed through the vacuum bag;
   a parting film formed over the composite part and the edge breather;
   a surface breather positioned between the parting film and the vacuum bag, wherein the surface breather is configured to allow air to pass from the composite part and out through the vacuum line;
   an edge sealant that provides a sealing layer between the part-supporting surface of the support tool and a peripheral edge of the vacuum bag.

* * * * *